United States Patent
Mkrtchyan et al.

(10) Patent No.: US 11,544,068 B2
(45) Date of Patent: Jan. 3, 2023

(54) SYSTEMS AND METHODS FOR GENERATING A PIPELINE OF STAGES FOR A PROCESS

(71) Applicant: Visier Solutions, Inc., Vancouver (CA)

(72) Inventors: Anna Mkrtchyan, Burnaby (CA); Anton Smessaert, Vancouver (CA)

(73) Assignee: Visier Solutions, Inc., Vancouver (CA)

( * ) Notice: Subject to any disclaimer, the term of this patent is extended or adjusted under 35 U.S.C. 154(b) by 0 days.

(21) Appl. No.: 17/033,243

(22) Filed: Sep. 25, 2020

(65) Prior Publication Data

US 2021/0096869 A1 Apr. 1, 2021

Related U.S. Application Data

(60) Provisional application No. 62/906,541, filed on Sep. 26, 2019.

(51) Int. Cl.
*G06F 9/38* (2018.01)
*G05B 19/418* (2006.01)
*G06Q 10/06* (2012.01)

(52) U.S. Cl.
CPC ..... *G06F 9/3826* (2013.01); *G05B 19/41805* (2013.01); *G06F 9/3836* (2013.01); *G06Q 10/0633* (2013.01); *G06Q 10/06316* (2013.01)

(58) Field of Classification Search
CPC ........... G06Q 10/00–50/00; G06F 1/00–40/00; G05B 1/00–24/00
USPC .............................................. 705/7.11–7.42
See application file for complete search history.

(56) References Cited

U.S. PATENT DOCUMENTS

| | | | | |
|---|---|---|---|---|
| 6,038,538 A | * | 3/2000 | Agrawal | G06Q 10/063 719/321 |
| 8,505,023 B2 | * | 8/2013 | Kikuchi | G06F 11/3476 718/101 |
| 8,650,063 B2 | * | 2/2014 | Yano | G06Q 10/06 705/7.27 |
| 8,713,070 B2 | * | 4/2014 | Nakazato | G06Q 10/0633 705/16 |
| 10,812,371 B2 | * | 10/2020 | Meredith | G06Q 10/047 |
| 2004/0260590 A1 | * | 12/2004 | Golani | G06Q 10/10 705/7.26 |
| 2005/0055697 A1 | * | 3/2005 | Buco | G06Q 10/06 718/105 |

(Continued)

*Primary Examiner* — Alan S Miller
(74) *Attorney, Agent, or Firm* — Morgan, Lewis & Bockius LLP

(57) ABSTRACT

An example method for gathering a plurality of data sets for a particular process is provided. Each data set indicates transitions between different stages for a corresponding occurrence of the particular process. The method includes generating stage transition data based on the plurality of data sets. The stage transition data indicates an aggregate value for each distinct transition. The method includes determining a root stage based on the plurality of data sets. The method includes selecting each additional stage in the pipeline of stages. Each additional stage is sequentially selected based on a dynamically determined path constructed to reduce a value of a cost function. The method includes selectively modifying the pipeline of stages responsive to detecting an improvement to the value of the cost function. The method also includes generating a command to perform the particular process using the modified pipeline of stages.

19 Claims, 12 Drawing Sheets

(56) References Cited

U.S. PATENT DOCUMENTS

| | | | | |
|---|---|---|---|---|
| 2005/0216181 A1* | 9/2005 | Estkowski | ............ | G08G 1/164 |
| | | | | 340/995.23 |
| 2009/0094074 A1* | 4/2009 | Nikovski | ........... | G06Q 10/0633 |
| | | | | 705/7.27 |
| 2010/0036606 A1* | 2/2010 | Jones | ................... | G09B 29/106 |
| | | | | 705/400 |
| 2011/0228696 A1* | 9/2011 | Agarwal | ................ | H04L 45/02 |
| | | | | 370/255 |
| 2011/0231573 A1* | 9/2011 | Vasseur | ................ | H04L 45/124 |
| | | | | 709/238 |
| 2011/0267351 A1* | 11/2011 | Curbera | ................ | G06T 11/206 |
| | | | | 345/440 |
| 2014/0058674 A1* | 2/2014 | Shekhar | ............... | G06Q 10/047 |
| | | | | 701/538 |
| 2015/0302317 A1* | 10/2015 | Norouzi | ................ | G06N 20/00 |
| | | | | 706/12 |
| 2017/0111245 A1* | 4/2017 | Ishakian | ............ | G06Q 10/0633 |
| 2020/0120012 A1* | 4/2020 | Meredith | ............. | H04L 45/127 |

* cited by examiner

Stage A - New Applicant
Stage B - Recruiter Review
Stage C - New Lead
Stage D - Reach Out and Response
Stage E - Recruiter Phone Call
Stage F - Manager Review
Stage G - Phone Interview
Stage H - Assessment
Stage I - On-Site Interview
Stage J - Final Interview
Stage K - Offer

300 ⇘

| Aggregate value | Transition |
|---|---|
| 65 | Ⓐ→Ⓑ |
| 30 | Ⓐ→Ⓕ |
| 5 | Ⓒ→Ⓓ |
| 65 | Ⓑ→Ⓔ |
| 35 | Ⓕ→Ⓖ |
| 5 | Ⓓ→Ⓕ |
| 65 | Ⓔ→Ⓕ |
| 60 | Ⓖ→Ⓗ |
| 30 | Ⓗ→Ⓘ |
| 25 | Ⓗ→Ⓙ |
| 60 | Ⓘ→Ⓙ |
| 25 | Ⓕ→Ⓘ |
| 23 | Ⓖ→Ⓘ |
| 28 | Ⓕ→Ⓙ |
| 100 | Ⓙ→Ⓚ |

*FIG. 3*

Potential Downstream Stages

1800

1802
Gather a plurality of data sets for a particular process, each data set indicating transitions between different stages for a corresponding occurrence of the particular process

1804
Generate stage transition data based on the plurality of data sets, the stage transition data indicating an aggregate value for each distinct transition

1806
Determine a root stage based on the plurality of data sets, the root stage indicating a first stage in the pipeline of stages for the particular process

1808
Select each additional stage in the pipeline of stages, each additional stage sequentially selected based on a dynamically determined path constructed to reduce a value of a cost function

1810
Selectively modify the pipeline of stages, starting at a last stage in the pipeline of stages and ending at the root stage, responsive to detecting an improvement to the value of the cost function

1812
Generate a command to perform the particular process using the modified pipeline of stages

*FIG. 18*

SYSTEMS AND METHODS FOR GENERATING A PIPELINE OF STAGES FOR A PROCESS

CROSS REFERENCE TO RELATED APPLICATION

This application claims priority to U.S. Provisional Patent Application Ser. No. 62/906,541 filed on Sep. 26, 2020, the contents of which are hereby incorporated in their entirety.

BACKGROUND

A process can be performed by executing different stages in various orders. In one occurrence of the process, a first set of stages can be executed to see the process through to completion. In another occurrence of the process, a second set of stages (e.g., a different set of stages) can be executed to see the process through to completion. It is the case that the first set of stages and the second set of stages are not mutually exclusive. For example, the first set of stages and the second set of stages can include similar stages that are executed to see the process through to completion.

As a non-limiting example, a human resources department may have different protocols (e.g., sets of stages) for hiring personnel. According to a first protocol (i.e., an applicant-initiated protocol), the human resources department receives an application from a new applicant. According to a second protocol (i.e., a department-initiated protocol), the human resources department receives a lead on a potential new hire and can reach out to the potential new hire without requiring the potential new hire to fill out an application. Nevertheless, the first protocol and the second protocol can include similar stages. As a non-limiting example, each protocol may include performance of a phone interview, an on-site interview, a manager review of qualifications, and the like.

Because there can be many different ways to perform a process (e.g., many different protocols for hiring personnel), some methods can be determined to be more effective than others. In some scenarios, it may be desirable to determine the most frequently used methods to perform the process. As a non-limiting example, the human resources department may desire to outline a path (i.e., a pipeline of stages) that represents the most commonly used method for hiring personnel. However, generation of the most commonly used method becomes increasingly difficult as the amount of distinct protocols used for hiring personnel increases.

BRIEF DESCRIPTION OF THE DRAWINGS

FIG. 3 depicts a diagram illustrating stage transition data for the particular process;

FIG. 18 depicts a flowchart illustrating a method of generating a pipeline of stages for a particular process.

DETAILED DESCRIPTION

Figure 1:
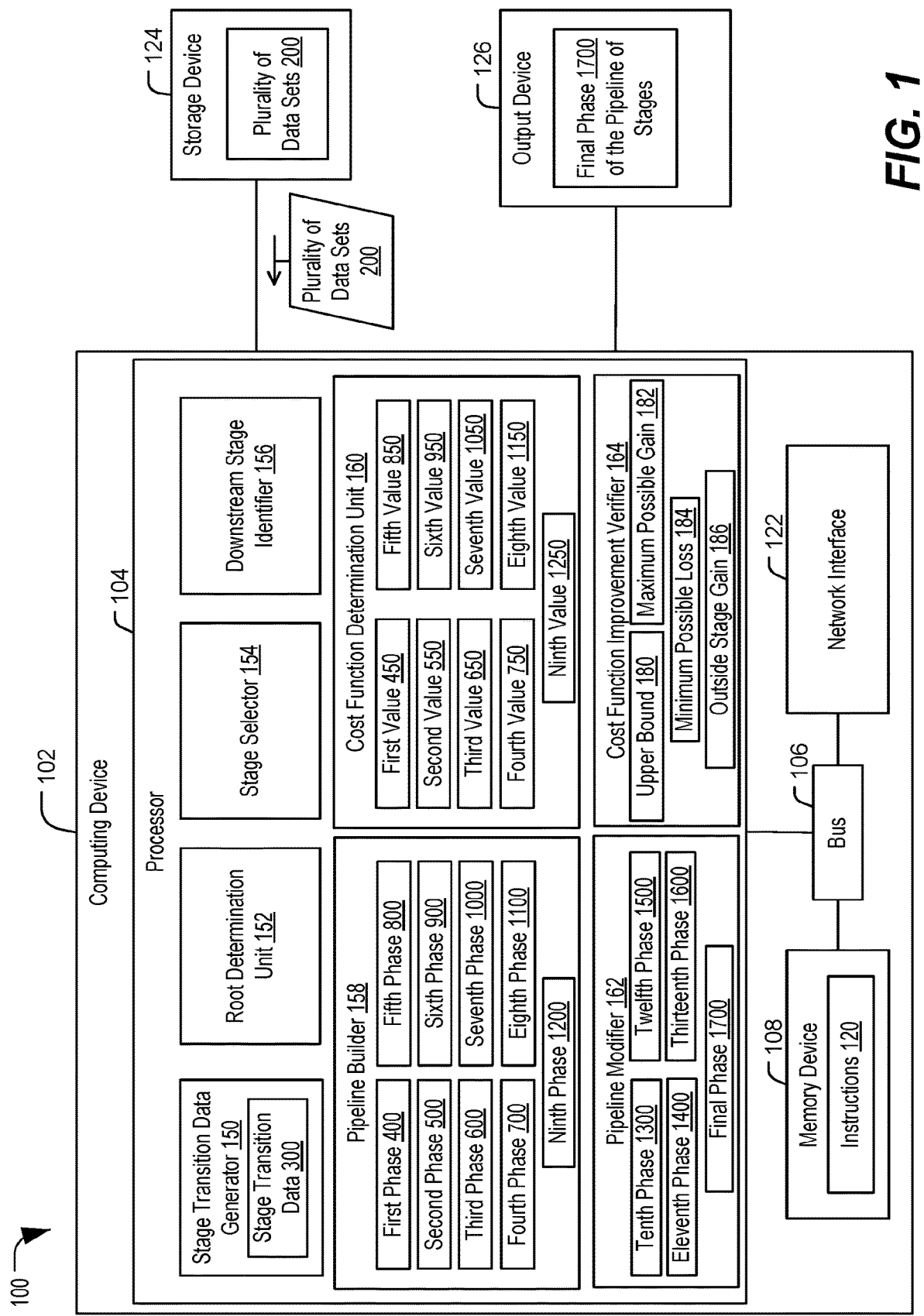
FIG. 1 depicts a diagram of a system for generating a pipeline of stages for a particular process.

The embodiments of the present disclosure enable generation and evaluation of a pipeline of stages for a particular process. The present disclosure describes various apparatus, computer-based methods, and storage devices including executable instructions which when followed, for example in response to executing instructions, searches for a more optimal pipeline of stages. For example, a computer may receive a plurality of data sets (e.g., a set of longitudinal data) for a particular process. The particular process may correspond to a human resources process, a semiconductor fabrication process, an assembly line process, a manufacturing process, a data processing process, a call center escalation process, a bespoke manufacturing process, and the like. Each data set indicates state changes (i.e., transitions between stages) during a corresponding occurrence of the particular process. The computer converts the plurality of data sets into a plurality of counts for transitions between stages. For example, the computer may generate stage transition data that indicates an aggregate value (e.g., a total count) for each distinct transition in the plurality of data sets.

The computer determines a root stage for the pipeline of stages using the plurality of data sets. The root stage indicates a start of the pipeline of stages. After determination of the root stage, the computer sequentially adds stages to the pipeline of stages in a manner to reduce a value of an objective or cost function that is used to determine the most frequently travelled path (e.g., a "greedy" path) for the particular process. For example, according to the embodiments disclosed herein, a best pipeline may be one that minimizes the value of the cost function. In some implementations, the computer adds stages to maximize the cost function and the best pipeline is the one that minimizes the value of the cost function. Minimization of the cost function is a way to express optimization.

The cost function favors transitions between stages in the direction of the pipeline, penalizes transitions between stages in an opposite direction of the pipeline, and penalizes transitions to stages that are left out of the pipeline. For example, the value of the cost function is reduced in response to detection of a transition between a stage in the direction of the pipeline (e.g., a downstream transition), the value of the cost function is increased in response to detection of a transition between a stage in the opposite direction of the pipeline (e.g., an upstream transition), and the value of the cost function is increased in response to detection of an additional stage that is not already in the pipeline. Because the computer sequentially adds stages to the pipeline, the latter condition occurs each time a new stage is added to the pipeline. However, after a new stage is added to the pipeline, the addition of the new stage decreases the value of the cost function for later stage additions to the pipeline. For example, if the pipeline starts at Stage A and transitions to Stage B, the addition of Stage C will increase the value of the cost function when Stage C is added to the pipeline because, at the time, Stage C is "not already in the pipeline." However, at time of the addition of the next stage (i.e., Stage D), the transition between Stage B and Stage C will decrease the value of the cost function because the transition is a "downstream transition" that is already in the pipeline. In a particular aspect, subsequent to the addition of Stage C to the pipeline, the value of the cost function that is associated with Stage C decreases because Stage C is "already in the pipeline." To implement this logic, the value of the cost function is dynamically determined each time an additional stage is added to the pipeline and is independent of a previous value of the cost function associated with addition of a previous stage to the pipeline. On the other hand, if at a later point in time there is a transition from Stage C to Stage B, this transition will increase the value of the cost function because the transition is an "upstream transition" that flows in the opposite direction of the pipeline.

After the pipeline is generated such that the greedy path transitions between stages (i.e., nodes) to effectively reduce or minimize the value of the cost function, the computer starts from the last node of the greedy path and moves backwards one stage at a time truncating the greedy path to determine whether an alternate path would have been a better approach (e.g., would result in a lower value of the cost function). For example, the computer can include different application-specific integrated circuits (ASICs) or field programmable gate arrays (FPGAs) configured to generate data indicating whether an alternate path would have been a better approach. The ASICS or FPGAs can modify data associated with the greedy path to generate an alternate path to be displayed to a user. However, instead of traversing each alternative path, the computer calculates a best possible improvement over the cost function associated with the greedy path by scanning a list of possible nodes that can appear downstream of the last node of the truncated greedy path. For example, the computer estimates an upper bound of the improvement over the value of the cost function to determine whether a potential reduction to the value of the cost function exists using potential downstream nodes. If the upper bound has the potential to improve the value of the cost function, the computer traverses the alternative path (e.g., greedy path) starting from the last node of the truncated greedy path using potential downstream nodes. If the traversed path results in a lower value of the cost function, then the traversed path is stored as the new greedy path.

It is to be understood that although various aspects may be described herein with reference to employee, workforce, and/or human resources data, this is for illustration only and not limiting. The techniques of the present disclosure are applicable for generating a pipeline of stages for different processes or environments.

Referring to FIG. 1, a diagram of a system 100 for generating a pipeline of stages for a particular process is illustrated. The system 100 includes a computing device 102. The computing device 102 may include a server computer, a personal computer, or any other computing device. The computing device 102 includes a processor 104, such as a central processing unit (CPU) or other processor. In some examples, the processor 104 may correspond to a group of processors. The processor 104 is communicatively coupled to a bus 106. The bus 106 may correspond to one bus or to a plurality of buses and may include a serial bus, a parallel bus, or a combination thereof. The computing device 102 further includes a memory device 108 and a network interface 122 communicatively coupled to the bus 106. In alternative examples, the computing device 102 may not include the bus 106 and the processor 104, the memory device 108, and the network interface 122 may communicate via alternative methods.

The memory device 108 may correspond to one or more memory devices and may include random access memory (RAM), such as static RAM (SRAM), dynamic RAM (DRAM), or any other type of RAM; read only memory (ROM), such as programmable ROM (PROM), erasable PROM (EPROM), electrically erasable PROM (EEPROM), optical storage media, or any other type of ROM; another type of computer memory; or a combination thereof. The network interface 122 may correspond to one or more network interfaces and may include a wired interface, a wireless interface, or a combination thereof. Examples of network interfaces include network interface controllers and modems. In some examples, the computing device 102 may not include the network interface 122. In the illustrated example, the memory device 108 stores instructions 120. The instructions 120 may be executable by the processor 104 to perform one or more of the operations and methods described herein.

The computing device 102 is coupled to a storage device 124 (e.g., a computer-readable storage device). The storage device 124 may include a hard disk drive, a solid state drive, a memory cache, or some other type of storage device. While illustrated external to the computing device 102, the storage device 124 may be included in the computing device 102 in other examples. Further, while the storage device 124 is illustrated directly coupled to the computing device 102, in other examples, the storage device 124 may be communicatively coupled to the computing device 102 via the network interface 122. The computing device 102 is also coupled to an output device 126. According to one implementation, the output device 126 includes a display device. While the output device 126 is illustrated as directly coupled to the computing device 102, in other examples, the output device 126 may be communicatively coupled to the computing device 102 via the network interface 122.

The network interface 122 may be communicatively coupled to a network (not shown). The network may correspond to one or more networks including a wired network, a wireless network, or a combination thereof. In some examples, the network includes components that function according to an Ethernet protocol, an Institute of Electrical and Electronics Engineers (IEEE) 802.11 protocol, a Long Term Evolution (LTE) protocol, another communication protocol, or a combination thereof.

The processor 104 includes a stage transition data generator 150, a root determination unit 152, a stage selector 154, a downstream stage identifier 156, a pipeline builder 158, a cost function determination unit 160, a pipeline modifier 162, and a cost function improvement verifier 164. According to some examples, one or more components 150 to 164 (even numbers and inclusive) of the processor 104 can be integrated into the processor 104 using field-programmable gate arrays (FPGAs) or other hardware. According to other examples, the processor 104 can execute the instructions 120 of the memory device 108 to perform the operations of the illustrated components 150-164. As described below, during operation, the processor 104 is configured to generate a pipeline of stages for a particular process, such as a human resources process, a semiconductor process, an assembly line process, a manufacturing process, a data processing process, and the like. For ease of explanation and illustration, unless indicated otherwise, the particular process described herein corresponds to a human resources process, such as a hiring process.

The processor 104 is configured to gather a plurality of data sets 200 for the particular process. For example, the storage device 124 stores the plurality of data sets 200 and the processor 104 retrieves the plurality of data sets 200 from the storage device 124. According to another implementation, the plurality of data sets 200 can be stored in the memory device 108 and retrieved by the processor 104 via the bus 106.

Figure 2:
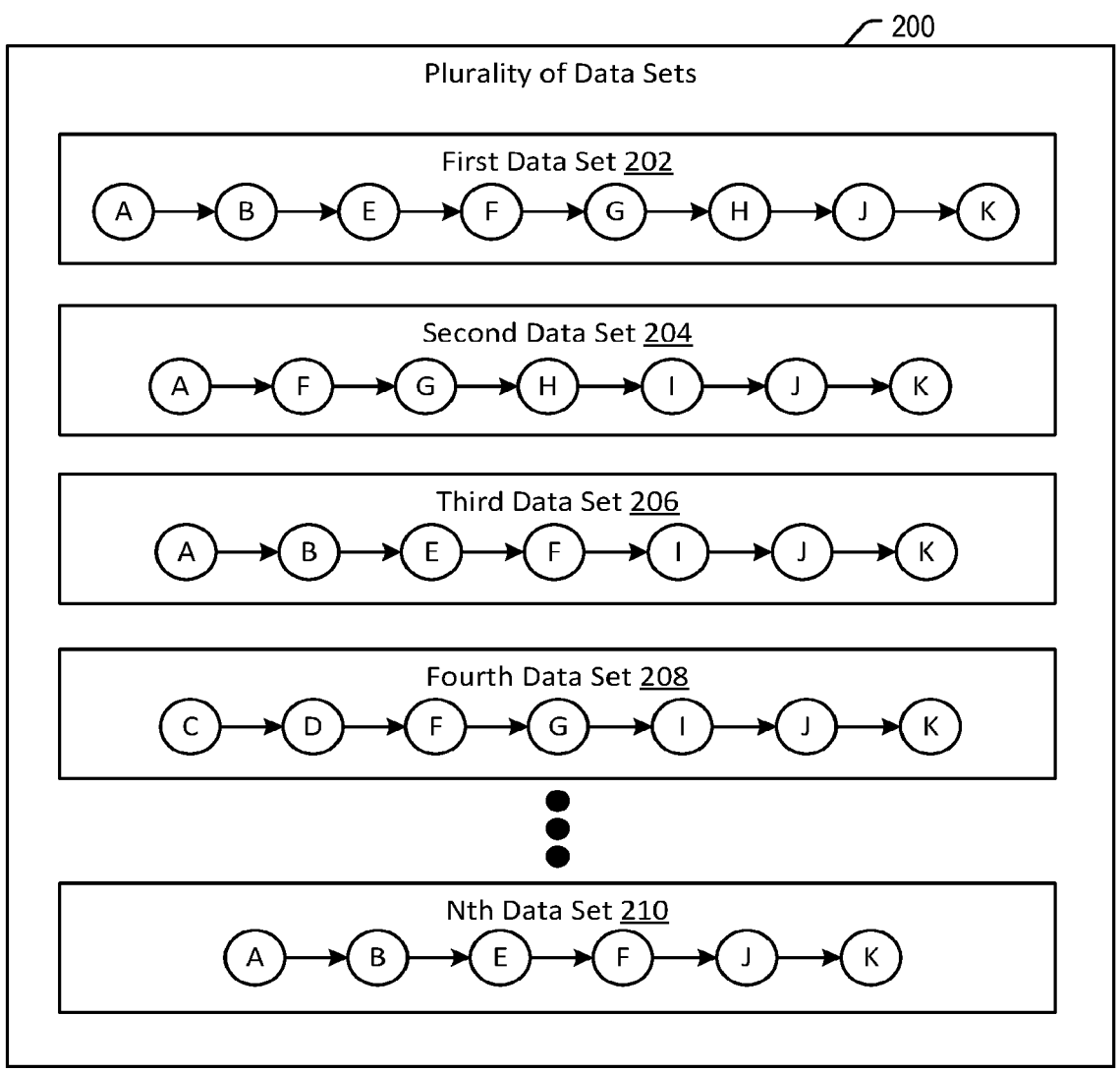
FIG. 2 depicts a diagram illustrating a plurality of data sets for the particular process.

Referring to FIG. 2, a diagram illustrating the plurality of data sets 200 for the particular process is shown. The plurality of data sets 200 includes a first data set 202, a second data set 204, a third data set 206, a fourth data set 208, and an Nth data set 210. In the illustrated example of FIG. 2, N is any integer value greater than one. For example, if N is equal to one-hundred, the plurality of data sets 200 includes one-hundred different data sets. Each data set 202-210 indicates transitions between different stages for a corresponding occurrence of the particular process (e.g., the hiring process).

Examples of different stages for the particular process are shown in FIG. 2. For example, Stage A can include identifying a new applicant, and Stage B can include performing a recruiter review of the new applicant. Stage C can include obtaining a new lead for a potential new hire, and Stage D can include reaching out to the potential new hire and receiving a response from the potential new hire. Stage E can include a recruiter phone call, Stage F can include a manager review, Stage G can include a phone interview, Stage H can include an assessment, Stage I can include an on-site interview, Stage J can include a final interview, and Stage K can include an offer. As described below, each iteration or occurrence of the particular process can include a different combination of the above-mentioned stages. A final phase 1700 of the pipeline of stages generated by the computing device 102 is indicative of a most frequently used path through select stages to perform the particular process.

The first data set 202 is indicative of a first occurrence of the particular process. According to the first data set 202, the particular process starts at Stage A, transitions to Stage B, transitions to Stage E, transitions to Stage F, transitions to Stage G, transitions to Stage H, transitions to Stage J, and finally transitions to Stage K. The second data set 204 is indicative of a second occurrence of the particular process. According to the second data set 204, the particular process starts at Stage A, transitions to Stage F, transitions to Stage G, transitions to Stage H, transitions to Stage I, transitions to Stage J, and finally transitions to Stage K. The third data set 206 is indicative of a third occurrence of the particular process. According to the third data set 206, the particular process starts at Stage A, transitions to Stage B, transitions to Stage E, transitions to Stage F, transitions to Stage I, transitions to Stage J, and finally transitions to Stage K. According to the fourth data set 208, the particular process starts at Stage C, transitions to Stage D, transitions to Stage F, transitions to Stage G, transitions to Stage I, transitions to Stage J, and finally transitions to Stage K. According to the Nth data set 210, the particular process starts at Stage A, transitions to Stage B, transitions to Stage E, transitions to Stage F, transitions to Stage J, and finally transitions to Stage K. Although the final transition in each data set 202-210 is a transition to Stage K, in some implementations, the final transition can be a transition to another stage.

Referring back to FIG. 1, the stage transition data generator 150 is configured to generate stage transition data 300 based on the plurality of data sets 200. The stage transition data 300 indicates an aggregate value for the t transitions between stages in the plurality of data sets 200. The aggregate value may be a sum or a total count, may be proportional to the total count, linear in the total count, or a summary statistic of the transitions between stages in the plurality of data sets 200. For example, the stage transition data generator 150 converts the plurality of data sets 200 into a plurality of counts (e.g., the stage transition data 300) for transitions between stages. The stage transition data 300 can be stored as a digraph, an adjacency matrix, or the like.

Referring to FIG. 3, a diagram illustrating the stage transition data 300 for the particular process is shown. The stage transition data 300 indicates an aggregate value for each transition between a distinct set of stages in the plurality of data sets 200. For example, the stage transition data 300 indicates that there are sixty-five (65) transitions between Stage A and Stage B, thirty (30) transitions between Stage A and Stage F, five (5) transitions between Stage C and Stage D, sixty-five (65) transitions between Stage B and Stage E, thirty-five (35) transitions between Stage F and Stage G, five (5) transitions between Stage D and Stage F, and sixty-five (65) transitions between Stage E and Stage F. The stage transition data 300 also indicates that there are sixty (60) transitions between Stage G and Stage H, thirty (30) transitions between Stage H and Stage I, twenty-five (25) transitions between Stage H and Stage J, sixty (60) transitions between Stage I and Stage J, twenty-five (25) transitions between Stage F and Stage I, twenty-three (23) transitions between Stage G and Stage I, twenty-eight (28) transition between Stage F and Stage J, and one-hundred (100) transitions between Stage J and Stage K.

According to one implementation, the stage transition data generator 150 weights different transitions between stages based on the aggregate value (e.g., total count). For example, a relatively large weight value can be assigned to the transition from Stage A to Stage B because there are sixty-five (65) transitions, and a relatively small weight value can be assigned to the transition from Stage C to Stage D because there are five (5) transitions.

Referring back to FIG. 1, the downstream stage identifier 156 is configured to determine potential downstream stages from any stage using the stage transition data 300. As used herein, a "potential downstream stage" refers to any stage that, as indicated by the stage transition data 300, can be transitioned to either directly or indirectly. As a non-limiting example, Stage G is a direct potential downstream stage from Stage F because the stage transition data 300 indicates a transition from Stage F to Stage G. As another non-limiting example, Stage H is an indirect potential downstream stage from Stage F because the stage transition data 300 indicates a transition from Stage F to Stage G and a transition from Stage G to Stage H. Thus, Stage H is a potential downstream stage from Stage F although there is no direct transition from Stage F to Stage H.

The root determination unit 152 is configured to determine a root stage based on, at least, the plurality of data sets 200. The root stage indicates a first stage in a pipeline of stages for the particular process. According to one implementation, the root determination unit 152 identifies particular stages that are not potential downstream stages from other stages. For example, the root determination unit 152 can identify Stage A and Stage C as stages that are not potential downstream stages from any other stage in the plurality of data sets 200. After identifying the stages that are not potential downstream stages from other stages, the root determination unit 152 can select, from the identified stages, the stage that is associated with the most transitions as the root stage. The root determination unit 152 can examine either the plurality of data sets 200 or stage determination data (e.g., the stage transition data 300). For example, there are sixty-five (65) transitions from Stage A to Stage B and thirty (30) transitions from Stage A to Stage F. Thus, Stage A is associated with ninety-five (95) transitions. In contrast, there are only five (5) transitions from Stage C to Stage D. Thus, Stage C is associated with five (5) transitions. As a result, the root determination unit 152 can determine that Stage A is the root stage. In a particular aspect, the root determination unit 152 generates a first count indicating a number of times Stage A appears as a first stage (e.g., an initial stage) in the plurality of data sets 200, generates a second count indicating a number of times Stage B appears as a first stage (e.g., an initial stage) in the plurality of data sets 200, for example. In a particular aspect, the root determination unit 152 determines that a Stage with a highest count is the root stage. In a particular implementation, the root determination unit 152 identifies particular stages that are infrequently downstream stages from other stages from the plurality of data sets 200 or from the plurality of data sets 200 and the stage transition data 300.

Figure 4:
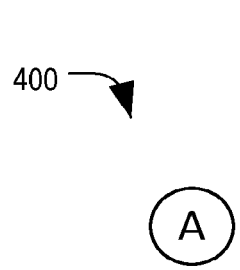
FIG. 4 depicts a diagram illustrating a first phase of the pipeline of stages for the particular process.

The pipeline builder 158 can generate a first phase 400 of the pipeline of stages starting with the root stage. Referring to FIG. 4, a diagram illustrating the first phase 400 of the pipeline of stages for the particular process is shown. As shown in FIG. 4, the first phase 400 of the pipeline of stages includes Stage A.

Each phase of the pipeline of stages has a corresponding value of a cost function. For example, the cost function determination unit 160 can determine a first value 450 of the cost function for the first phase 400 of the pipeline of stages. The first value 450 is based solely on the addition of Stage A to the pipeline of stages. A value of the cost function is dynamically determined each time an additional stage is added to the pipeline and is independent of a previous value of the cost function associated with addition of a previous stage.

The value of the cost function is based on three principles. First, the value of the cost function is reduced in response to detection of a transition between stages in the pipeline of stages according to a first direction (e.g., a downstream direction). For example, the value of the cost function is reduced by at least the product of a cost of transition per unit weight for a transition within the pipeline of stages in the first direction, and a weight for a transition within the pipeline of stages in the first direction. In another example, the value of the cost function is reduced by at least the sum of: a first product of a first cost of transition per unit weight for a transition within the pipeline of stages in the first direction, and a first weight for a transition within the pipeline of stages in the first direction to a next nearest neighboring stage; and a second product of a second cost of transition per unit weight for a transition within the pipeline of stages in the first direction, and a second weight for a transition within the pipeline of stages in the first direction to stage beyond the next nearest neighboring stage. For example, the value of the cost function is reduced according to the following equation: $-\alpha \cdot w(S_i \rightarrow S_{i+1}) - \eta\alpha \cdot w(S_i \rightarrow S_{j>i})$, where $S_i$ corresponds to stages (e.g., nodes) that are included in the pipeline of stages, $\alpha$ corresponds to a cost of transition per unit weight for a transition within the pipeline of stages in the first direction to a nearest neighboring stage, and $\eta\alpha$ corresponds to a cost of transition per unit weight for a transition within the pipeline of stages to a stage other than a nearest neighboring stage.

Second, the value of the cost function is increased in response to detection of a transition between stages in the pipeline of stages according to a second direction (e.g., an "upstream" direction). For example, the value of the cost function is increased by at least the product of a cost of transition per unit weight for a transition within the pipeline of stages in the second direction, and a weight for a transition within the pipeline of stages in the second direction. In some implementations, the value of the cost function is increased by at least the sum of a first product of a first cost of transition per unit weight for a transition within the pipeline of stages in the second direction, and a first weight for a transition within the pipeline of stages in the second direction to a previous nearest neighboring stage; and a second product of a second cost of transition per unit weight for a transition within the pipeline of stages in the second direction, and a second weight for a transition within the pipeline of stages in the second direction to stage before the previous nearest neighboring stage. For example, the value of the cost function is increased according to the following equation: $\beta \cdot w(S_i \rightarrow S_{i-1}) + \gamma\beta \cdot w(S_i \rightarrow S_{j<(i-1)})$, where $\beta$ corresponds to a cost of a transition per unit weight for a transition within the pipeline of stages in the second direction to a nearest neighboring stage, and $\gamma\beta$ corresponds to a cost of transition per unit weight for a transition within the pipeline of stages in the second direction to a stage other than a nearest neighboring stage.

Third, the value of the cost function is increased in response to detection of a transition between a stage in the pipeline of stages and a stage outside of a pipeline of stages. For example, the value of the cost function is increased according to the following equation: $|\lambda \cdot w(S_i \rightarrow S_{out}) - \mu \cdot w (S_{out} \rightarrow S_i)| + v \cdot |w (S_{out} \rightarrow S_{out}') - w(S_{Out}', S_{out})|$, where $S_{out}$ corresponds to stages (e.g., nodes) that are not a part of the pipeline of stages (i.e., new stages to be potentially added to the pipeline), $\lambda$ corresponds to a cost of transition per unit weight for a transition from a stage in the pipe-line of stage to a stage outside of the pipeline of stages, $\mu$ corresponds to a cost of transition per unit weight for a transition from a stage in the pipe-line of stage to a stage outside of the pipeline of stages, and $v$ corresponds to a cost of transition per unit weight for transitions between stages that are not a part of the pipeline of stages.

As a result, the value of the cost function (e.g., the total cost ($J_{total}$)) is a sum over cost functions associated with transitions between stages that both belong to the pipeline of stages, transitions between a stage that is included in the pipeline of stages and a stage that is outside of the pipeline of stages, and transitions between stages that are both outside the pipeline of stages. The value of the cost function is equal to $J_{total} = \Sigma_{\{i,j\},i<j} J(S_i,S_j) + \Sigma_{\{i,out\}} J(S_i,S_{out}) + \Sigma_{\{out,out'\},out<out'} J(S_{out}, S_{out'})$. The parameters ($\alpha$, $\beta$, $\eta$, $\gamma$, $\lambda$, $\mu$, $v$) regulate the strength of each transitions' contribution to the value of the cost function. According to one implementation, $\alpha=\beta=1$, $\eta=\gamma=0.1$, and $\lambda=\mu=v=0.01$. Based on the above parameter values, downstream transitions to the nearest neighbor stage are favored the most (i.e., results in relatively large decreases to the value of the cost function), upstream transitions to the nearest neighbor stage are penalized the most (i.e., results in relatively large increases to the value of the cost function), and transitions between stages that are not nearest have less impact to the value of the cost function.

Thus, according to the terms of the cost function, each time that the pipeline builder 158 adds a new stage to the pipeline of stages, the value of the cost function increases, in part, based on the new addition. However, the value of the cost function also decreases, in part, based on other transitions that were previously incorporated into the pipeline of stages and represent transitions in the downstream direction. Downstream transitions, other than transitions that are associated with a new stage, reduce the value of the cost function. Upstream transitions increase the value of the cost function. Additionally, transitions that account for the fact that some stages are excluded from the pipeline of stages increase the value of the cost function by a smaller amount than transitions within the pipeline of stages. The above-described changes to the value of the cost function result in lower values of the cost function for pipelines that are representative of more frequently occurring transitions for the particular process.

Referring back to FIG. 1, the stage selector 154 is configured to select an additional stage to add to the pipeline of stages to generate a second phase 500 of the pipeline of stages. For example, the pipeline builder 158 can modify data representative of the pipeline of stages to generate the second phase 500 of the pipeline of stages. The additional stage is sequentially selected based on a dynamically determined path (e.g., a "greedy" path) constructed to reduce the value of a cost function using the above-described terms. The stage selector 154 can select an additional stage (i.e., Stage B), based on the stage transition data 300, to generate the second phase 500 of the pipeline of stages that has a second value 550 of the cost function. According to one implementation, the stage selector 154 can select the additional stage from the stage transition data 300, the plurality of data sets 200, etc.

Figure 5:
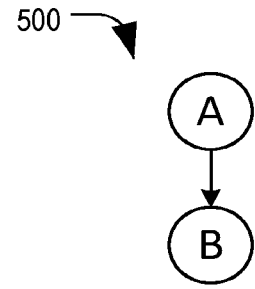
FIG. 5 depicts a diagram illustrating a second phase of the pipeline of stages for the particular process.

Referring to FIG. 5, a diagram illustrating the second phase 500 of the pipeline of stages for the particular process is shown. As shown in FIG. 5, the second phase 500 of the pipeline of stages includes Stage A and a transition to Stage B. Using the above-described terms, addition of the transition from Stage A to Stage B decreases the value of the cost function. For example, the cost function determination unit 160 increases the value of the cost function in response to detection (or in response an occurrence) of a transition between a stage in the pipeline of stages (i.e., Stage A) and a stage outside of a pipeline of stages (i.e., Stage B). Thus, the cost function determination unit 160 determines the second value 550 of the cost function using the above-described terms.

Referring back to FIG. 1, the stage selector 154 is configured to select an additional stage to add to the pipeline of stages to generate a third phase 600 of the pipeline of stages. The additional stage is sequentially selected based on the dynamically determined path constructed to reduce the value of a cost function using the above-described terms. The stage selector 154 can select an additional stage (i.e., Stage E), based on the stage transition data 300, to generate the third phase 600 of the pipeline of stages that has a third value 650 of the cost function.

Figure 6:
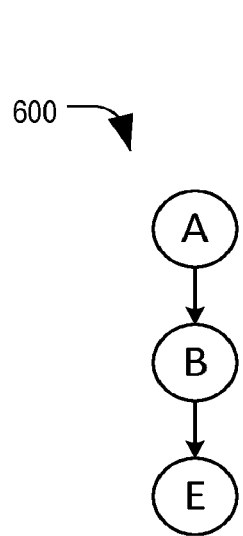
FIG. 6 depicts a diagram illustrating a third phase of the pipeline of stages for the particular process.

Referring to FIG. 6, a diagram illustrating the third phase 600 of the pipeline of stages for the particular process is shown. As shown in FIG. 6, the third phase 600 of the pipeline of stages includes the transition from Stage A to Stage B and a transition from Stage B to Stage E (i.e., a new downstream transition). Using the above-described terms, addition of the transition from Stage B to Stage E decreases the value of the cost function. For example, the cost function determination unit 160 increases the value of the cost function in response to detection of a transition between a stage in the pipeline of stages (i.e., Stage B) and a stage that was previously outside of a pipeline of stages (i.e., Stage E). However, the downstream transition from Stage A to Stage B now serves to reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage E to the pipeline of stages generates the third value 650 of the cost function that is lower than the second value 550 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate a fourth phase 700 of the pipeline of stages. The additional stage is sequentially selected based on the greedy path constructed to reduce the value of a cost function using the above-described terms. The stage selector 154 can select an additional stage (i.e., Stage F), based on the stage transition data 300, to generate the fourth phase 700 of the pipeline of stages that has a fourth value 750 of the cost function.

Figure 7:
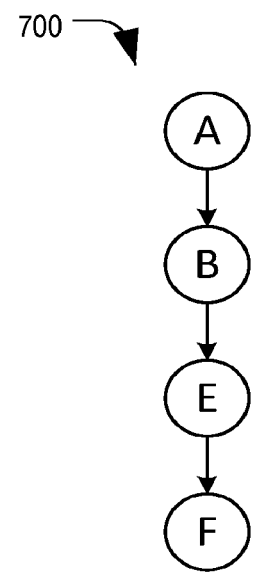
FIG. 7 depicts a diagram illustrating a fourth phase of the pipeline of stages for the particular process.

Referring to FIG. 7, a diagram illustrating the fourth phase 700 of the pipeline of stages for the particular process is shown. As shown in FIG. 7, the fourth phase 700 of the pipeline of stages includes the transition from Stage A to Stage B, the transition from Stage B to Stage E, and a transition from Stage E to Stage F (i.e., a new downstream transition). In the context of the third phase 600 of FIG. 6 and using the above-described terms, addition of the transition from Stage E to Stage F increases the value of the cost function. For example, the cost function determination unit 160 increases the value of the cost function in response to detection of a transition between a stage in the pipeline of stages (i.e., Stage E) and a stage outside of a pipeline of stages (i.e., Stage F). However, in the context of the fourth phase 700 shown in FIG. 7, Stage F is in the pipeline and the presence (e.g., previous addition) of the transition from Stage E to Stage F impacts the cost function accordingly. As well, the downstream transitions located upstream of the recently added transition (e.g., upstream of Stage F, downstream transitions between Stage A and Stage E) now serve to reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage F to the pipeline of stages generates the fourth value 750 of the cost function that is lower than the third value 650 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate a fifth phase 800 of the pipeline of stages. The additional stage is sequentially selected based on the greedy path constructed to reduce the value of a cost function using the above-described terms. The stage selector 154 can select an additional stage (i.e., Stage G), based on the stage transition data 300, to generate the fifth phase 800 of the pipeline of stages that has a fifth value 850 of the cost function.

Figure 8:
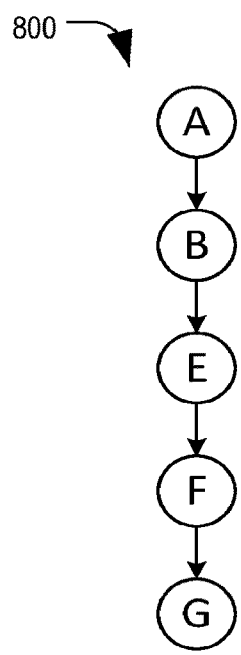
FIG. 8 depicts a diagram illustrating a fifth phase of the pipeline of stages for the particular process.

Referring to FIG. 8, a diagram illustrating the fifth phase 800 of the pipeline of stages for the particular process is shown. As shown in FIG. 8, the fifth phase 800 of the pipeline of stages includes the transition from Stage A to Stage B, the transition from Stage B to Stage E, the transition from Stage E to Stage F, and a transition from Stage F to Stage G (i.e., a new downstream transition). In the context of the fourth phase 700 shown in FIG. 7 and using the above-described terms, addition of the transition from Stage F to Stage G increases the value of the cost function. For example, the cost function determination unit 160 increases the value of the cost function in response to detection of a transition between a stage in the pipeline of stages (i.e., Stage F) and a stage outside of a pipeline of stages (i.e., Stage G). However, in the context of the fifth phase 800, Stage G is in the pipeline and presence of the transition from Stage F to Stage G does not increase the value of the cost function. In addition, the previously added downstream transitions (e.g., between Stage A and Stage F) reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage G to the pipeline of stages generates the fifth value 850 of the cost function that is lower than the fourth value 750 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate a sixth phase 900 of the pipeline of stages. The additional stage is sequentially selected based on the greedy path constructed to reduce the value of a cost function using the above-described terms. The stage selector 154 can select an additional stage (i.e., Stage H), based on the stage transition data 300, to generate the sixth phase 900 of the pipeline of stages that has a sixth value 950 of the cost function.

Figure 9:
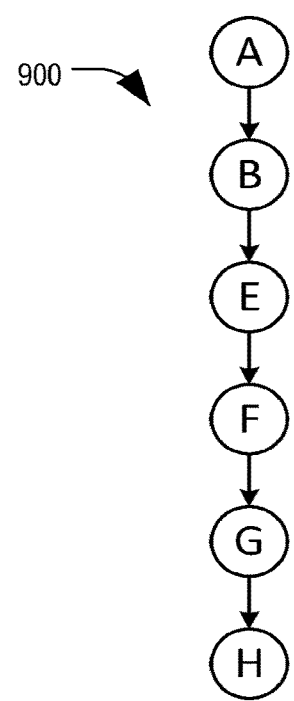
FIG. 9 depicts a diagram illustrating a sixth phase of the pipeline of stages for the particular process.

Referring to FIG. 9, a diagram illustrating the sixth phase 900 of the pipeline of stages for the particular process is shown. As shown in FIG. 9, the sixth phase 900 of the pipeline of stages includes the transition from Stage A to Stage B, the transition from Stage B to Stage E, the transition from Stage E to Stage F, the transition from Stage F to Stage G, and a transition from Stage G to Stage H (i.e., a new downstream transition). In the context of the fifth phase 800 of FIG. 8 and using the above-described terms, addition of the transition from Stage G to Stage H increases the value of the cost function. For example, the cost function determination unit 160 increases the value of the cost function in response to detection of a transition between a stage in the pipeline of stages (i.e., Stage G) and a stage outside of a pipeline of stages (i.e., Stage H). However, in the context of the sixth phase 900, Stage H is in the pipeline and the presence of the (e.g., previously added) transition from Stage G to Stage H impacts the cost function accordingly (e.g., in pipeline cost and down stream). In addition, the downstream transitions between Stage A and Stage G now reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage H to the pipeline of stages generates the sixth value 950 of the cost function that is lower than the fifth value 850 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate a seventh phase 1000 of the pipeline of stages. The additional stage is sequentially selected based on the greedy path constructed to reduce the value of a cost function using the above-described terms. The stage selector 154 can select an additional stage (i.e., Stage I), based on the stage transition data 300, to generate the seventh phase 1000 of the pipeline of stages that has a seventh value 1050 of the cost function.

Figure 10:
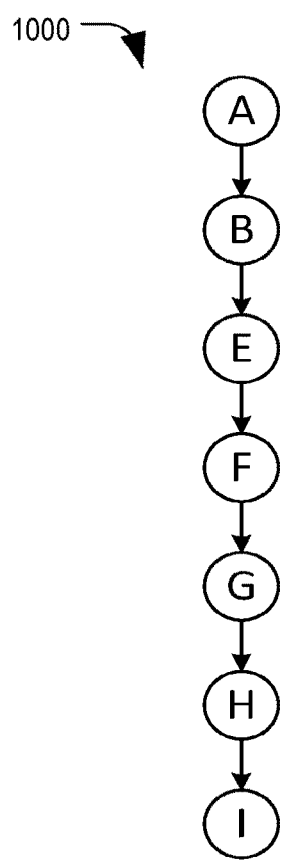
FIG. 10 depicts a diagram illustrating a seventh phase of the pipeline of stages for the particular process.

Referring to FIG. 10, a diagram illustrating the seventh phase 1000 of the pipeline of stages for the particular process is shown. As shown in FIG. 10, the seventh phase 1000 of the pipeline of stages includes the transition from Stage A to Stage B, the transition from Stage B to Stage E, the transition from Stage E to Stage F, the transition from Stage F to Stage G, the transition from Stage G to Stage H, and a transition from Stage H to Stage I (i.e., a new downstream transition). As previously described above, the content of the seventh phase 1000 differs from the sixth phase 900 of FIG. 9. In the context of the sixth phase 900 and using the above-described terms, addition of the transition from Stage H to Stage I increases the value of the cost function. For example, the cost function determination unit 160 increases the value of the cost function in response to detection of a transition between a stage in the pipeline of stages (i.e., Stage H) and a stage outside of a pipeline of stages (i.e., Stage I). However, in the context of the seventh phase 1000 the presence of Stage H and the downstream transitions between Stage A and Stage H reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage I to the pipeline of stages generates the seventh value 1050 of the cost function that is lower than the sixth value 950 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate an eighth phase 1100 of the pipeline of stages. The additional stage is sequentially selected based on the greedy path constructed to reduce the value of a cost function using the above-described terms. The stage selector 154 can select an additional stage (i.e., Stage J), based on the stage transition data 300, to generate the eighth phase 1100 of the pipeline of stages that has an eighth value 1150 of the cost function.

Figure 11:
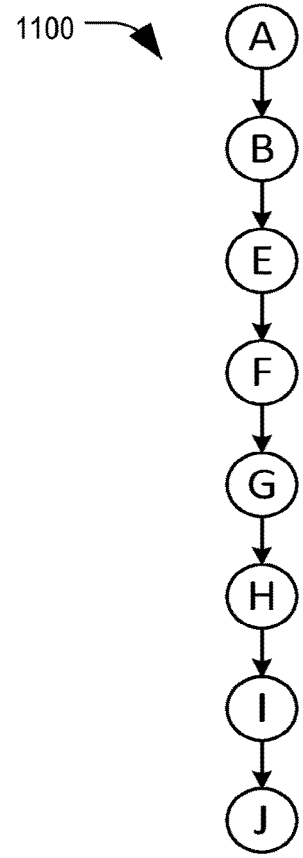
FIG. 11 depicts a diagram illustrating an eighth phase of the pipeline of stages for the particular process.

Referring to FIG. 11, a diagram illustrating the eighth phase 1100 of the pipeline of stages for the particular process is shown. As shown in FIG. 11, the eighth phase 1100 of the pipeline of stages includes the transition from Stage A to Stage B, the transition from Stage B to Stage E, the transition from Stage E to Stage F, the transition from Stage F to Stage G, the transition from Stage G to Stage H, the transition from Stage H to Stage I, and a transition from Stage I to Stage J (i.e., a new downstream transition). As previously described above the content in the eighth phase 1100 differs from the seventh phase 1000 of FIG. 10. In the context of the seventh phase 1000 and using the above-described terms, addition of the transition from Stage I to Stage J increases the value of the cost function. For example, the cost function determination unit 160 increases the value of the cost function in response to detection of a transition between a stage in the pipeline of stages (i.e., Stage I) and a stage outside of a pipeline of stages (i.e., Stage J). However, in the context of the eighth phase 1100, the presence of Stage J has a different impact on the cost function. In addition, the downstream transitions between Stage A and Stage I reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage J to the pipeline of stages generates the eighth value 1150 of the cost function that is lower than the seventh value 1050 of the cost function. Adding stages to the pipeline of stages that results in a lower value of the cost function can result in an extension of the greedy path.

Referring back to FIG. 1, the stage selector 154 is configured to select an additional stage to add to the pipeline of stages to generate a ninth phase 1200 of the pipeline of stages. The additional stage is sequentially selected based on the greedy path constructed to reduce the value of a cost function using the above-described terms. The stage selector 154 can select an additional stage (i.e., Stage K), based on the stage transition data 300, to generate the ninth phase 1200 of the pipeline of stages that has a ninth value 1250 of the cost function.

Figure 12:
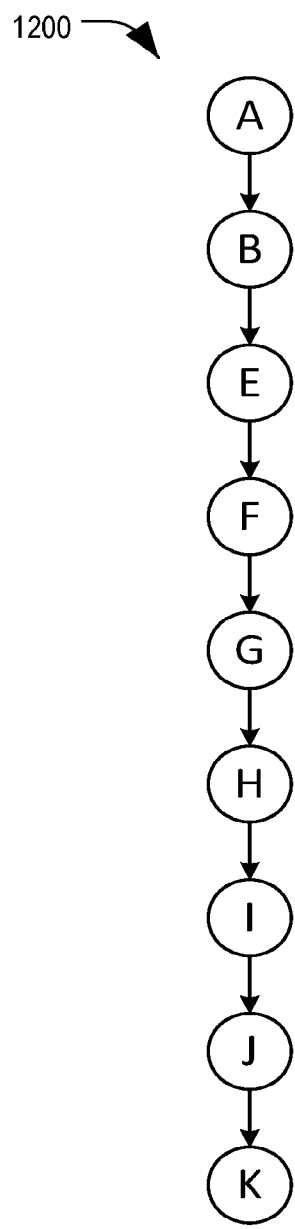
FIG. 12 depicts a diagram illustrating a ninth phase of the pipeline of stages for the particular process.

Referring to FIG. 12, a diagram illustrating the ninth phase 1200 of the pipeline of stages for the particular process is shown. As shown in FIG. 12, the ninth phase 1200 of the pipeline of stages includes the transition from Stage A to Stage B, the transition from Stage B to Stage E, the transition from Stage E to Stage F, the transition from Stage F to Stage G, the transition from Stage G to Stage H, the transition from Stage H to Stage I, the transition from Stage I to Stage J, and a transition from Stage J to Stage K (i.e., a new downstream transition). In the context of the eighth phase 1100 and using the above-described terms, addition of the transition from Stage J to Stage K increases the value of the cost function. For example, the cost function determination unit 160 increases the value of the cost function in response to detection of a transition between a stage in the pipeline of stages (i.e., Stage J) and a stage outside of a pipeline of stages (i.e., Stage K). However, in the context of the ninth phase 1200, Stage K is in the pipeline and reevaluating the cost function will lead to a different value. In addition, the downstream transitions between Stage A and Stage J reduce the value of the cost function. For example, the cost function determination unit 160 decreases the value of the cost function in response to detection of a transition between stages in the pipeline of stages according to the first direction (e.g., the "downstream" direction). Thus, the cost function determination unit 160 determines that addition of Stage K to the pipeline of stages generates the ninth value 1250 of the cost function that is lower than the eighth value 1150 of the cost function. Adding stages to the pipeline of stages that results in a lower value of the cost function can result in an extension of the greedy path.

After the addition of Stage K, the processor 104 (i.e., the downstream stage identifier 156) can determine, based on the stage transition data 300, that there are no more potential downstream stages and that the greedy path is complete. As a result, the pipeline modifier 162 is configured to selectively modify the pipeline of stages, starting at a last stage (i.e., Stage K) in the pipeline of stages and ending at the root stage, based on a determination of whether a potential reduction to the value of the cost function exist using potential downstream stages indicated by the stage transition data 300. Thus, to modify the pipeline of stages, the pipeline modifier 162 is configured to truncate the last stage from the pipeline, as illustrated in FIG. 13.

Figure 13:
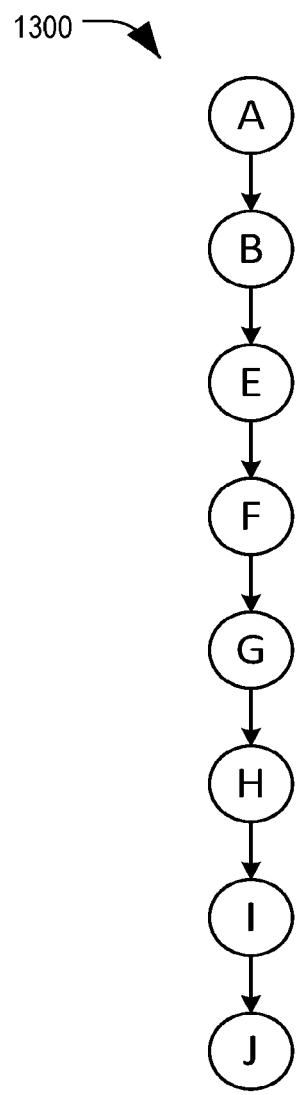
FIG. 13 depicts a diagram illustrating a tenth phase of the pipeline of stages for the particular process.
Figure 13:

Referring to FIG. 13, a diagram illustrating a tenth phase 1300 of the pipeline of stages for the particular process is shown. According to FIG. 13, Stage K has been truncated (i.e., removed) from the pipeline of stages and the potential downstream stages (i.e., Stage K) are illustrated. The pipeline modifier 162 and the cost function improvement verifier 164 are configured to determine whether a potential reduction to the value of the cost function exists at Stage J using a potential downstream stage other than the last stage (i.e., Stage K).

To determine whether a potential reduction to the value of the cost function could exist at a particular stage without traversing each potential alternative path, the cost function improvement verifier 164 is configured to determine a best possible improvement over the ninth value 1250 of the cost function associated with the greedy path by scanning the list of potential downstream stages of the last node truncated from the greedy path. For example, the cost function improvement verifier 164 can determine an "upper bound" 180 of the improvement over an existing cost function (e.g., the ninth value 1250 of the cost function) of the greedy path using a best possible configuration of stages that can improve upon the existing cost function of the greedy path. If the upper bound 180 has the potential to improve upon the existing cost function of the greedy path, the pipeline modifier 162 can traverse the greedy path.

To determine whether the upper bound 180 has the potential to improve upon the existing cost function of the greedy path, the pipeline modifier 162 truncates the greedy path by discarding stages. As illustrated in FIG. 13, Stage K has been truncated. For exemplary purposes, assume that the truncated greedy path illustrated in FIG. 13 includes stages $\{S_1, S_2, \ldots, S_{i-1}\}$, where $S_i$ corresponds to Stage A, $S_2$ corresponds to Stage B, and corresponds to Stage J. Additionally, for exemplary purposes, assume that the ninth value 1250 of the cost function of the greedy path illustrated in FIG. 12 is equal to $J_{greedy}$ and the truncated greedy path has a value of the cost function that is equal to $J_{truncated}$. The cost function improvement verifier 164 can evaluate an alternative path that will be built by adding Stage $S_i$ to the truncated path ending at Stage Using the stage transition data 300 (or the downstream stage identifier 156), the processor 104 can identify a set of all possible stages downstream of the Stage $S_i$. For ease of explanation, assume that the set of stages $\{P_1, P_2, \ldots, P_j\}$ are the possible stages downstream of the Stage $S_i$.

For the Stage $P_j$, the cost function improvement verifier 164 can determine a maximum possible gain 182 as the decrease in the value ($J_{truncated}$) assuming all the stages were added to the pipeline of stages in the best possible configuration. The maximum possible gain ($Gain_{max}$) 182 can be determined using the following equation:

$Gain_{max} = \alpha \cdot W(S_{i-1} \rightarrow S_i) + \Sigma_{j=1, i-2} \eta \cdot \alpha \cdot w(S_j \rightarrow S_i) + \Sigma_{k=1,\ldots,i, l=1,\ldots,j} (\alpha, \eta) \cdot w(S_k \rightarrow P_l) + \Sigma_{k>l} (\alpha, \eta \alpha) \cdot w(P_k \rightarrow P_l) + \Sigma_{k>l} (\alpha, \eta \alpha) \cdot w(P_l \rightarrow P_k)$. Using the above equation, the cost function improvement verifier 164 can verify that the maximum possible gain 182 is larger than the gain if the processor 104 were to traverse starting from Stage $S_i$.

For the Stage $P_j$, the cost function improvement verifier 164 can also determine a minimum possible loss 184 as the increase in the value ($J_{truncated}$) assuming all the stages were added to the pipeline of stages in the best possible configuration. The minimum possible loss ($Loss_{min}$) can be determined using the following equation: $Loss_{min} = \beta \cdot w(S_{i-1} \rightarrow S_i) + \Sigma_{j=1,i-2} \gamma \cdot \beta \cdot w(S_i \rightarrow S_j) + \Sigma_{k=1,\ldots,i,l=1,\ldots,j}(\beta, \gamma\beta) \cdot w(P_l \rightarrow P_k)$. Additionally, for Stage $P_j$, the cost function improvement verifier 164 can determine an outside stage gain 186. The outside stage gain 186 can be determined using the following equation: $OutsideStageGain = \Sigma_{j=1,i-1} |\lambda^* w(S_j \rightarrow S_i) - \mu \cdot w(S_i \rightarrow S_j)| + \Sigma_{k=1,\ldots,i,l=1,\ldots,j} |\lambda \cdot w(S_k \rightarrow P_l) - \mu \cdot w(P_l \rightarrow S_k)| + \Sigma_{k<l} |\lambda \cdot w(P_k \rightarrow P_l) - \mu \cdot w(P_l \rightarrow P_k)| + \Sigma_{k>l} (P_k \rightarrow P_l) - w(P_l \rightarrow P_k)|$.

The cost function improvement verifier 164 can determine the upper bound ($J_{potential}$) 180 based on the maximum possible gain 182, the minimum possible loss 184, and the outside stage gain 186. For example, the cost function improvement verifier 164 can determine the upper bound ($J_{potential}$) 180 using the following equation: $J_{potential} = J_{truncated} - Gain_{max} + Loss_{min} - OutsideStageGain$. If the upper bound ($J_{potential}$) 180 is less than the ninth value 1250 of the cost function associated with the greedy path ($J_{greedy}$), the pipeline modifier 162 is configured to traverse the greedy path ($J_{greedy}$) starting at the Stage $S_i$ and evaluate the value of the cost function. If an alternate path has a lower value of the cost function, the alternate path becomes the new greedy path.

If the cost function improvement verifier 164 determines that there is no potential reduction to the ninth value 1250 of the cost function (i.e., no potential reduction of the value of the cost function exist using downstream stages), the processor 104 can output the ninth phase 1200 of the pipeline of stages to the output device 126. In this scenario, the upper bound 180 is equal to the ninth value 1250 of the cost function. Thus, the ninth phase 1200 of the pipeline of stages is indicative of the greedy path (e.g., the most frequently travelled path to complete the particular process).

However, if the cost function improvement verifier 164 determines that there is a potential reduction to the ninth value 1250 of the cost function (e.g., the upper bound 180 is less than the ninth value 1250 of the cost function associated with the greedy path), the pipeline modifier 162 truncates the last stage of the pipeline of stages, as illustrated in FIG. 13, and begins to traverse for an alternative path that results in a lower value of the cost function. The examples depicted in FIGS. 13-17 are based on a conclusion that there is a potential reduction to the ninth value 1250 of the cost function (e.g., the upper bound 180 is less than the ninth value 1250 of the cost function associated with the greedy path).

Because, in this example, there are no potential downstream stages other than Stage K in the tenth phase 1300 of the pipeline of stages, no potential reduction to the ninth value 1250 of the cost function exists. As a result, the pipeline modifier 162 is configured to truncate Stage J in response to a determination that an alternative path cannot be constructed from Stage J.

Figure 14:
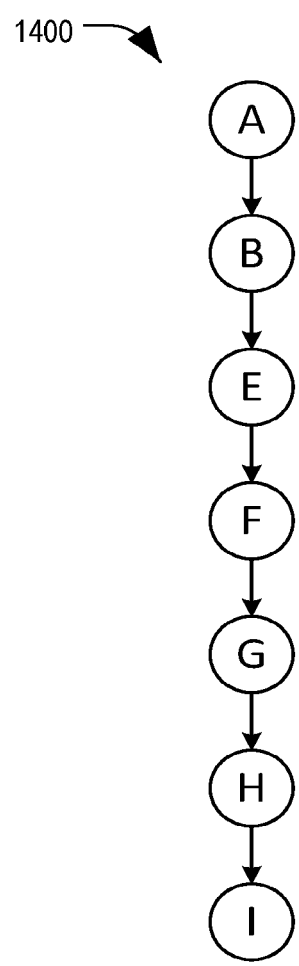
FIG. 14 depicts a diagram illustrating an eleventh phase of the pipeline of stages for the particular process.
Figure 14:

Referring to FIG. 14, a diagram illustrating an eleventh phase 1400 of the pipeline of stages for the particular process is shown. According to FIG. 14, Stage J has been truncated (i.e., removed) from the pipeline of stages and the potential downstream stages (i.e., Stage J and Stage K) are illustrated. The pipeline modifier 162 is configured to perform a traversal and determine whether an alternative path, starting from Stage I and using the downstream stages, results in a reduction to the ninth value 1250 of the cost function. If an alternate path results in reduction to the ninth value 1250 of the cost function, the alternate path becomes the new greedy path. If the alternate path does not result in reduction to the ninth value 1250 of the cost function, the pipeline modifier 162 is configured to truncate Stage I and perform a path traversal.

Figure 15:
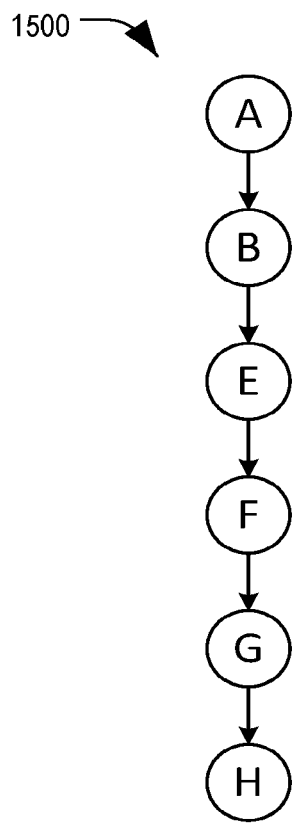
FIG. 15 depicts a diagram illustrating a twelfth phase of the pipeline of stages for the particular process.
Figure 15:
Figure 16:
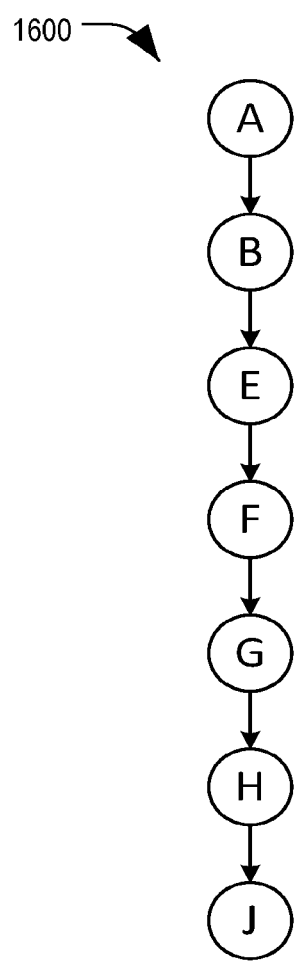
FIG. 16 depicts a diagram illustrating a thirteenth phase of the pipeline of stages for the particular process.
Figure 16:
Figure 17:
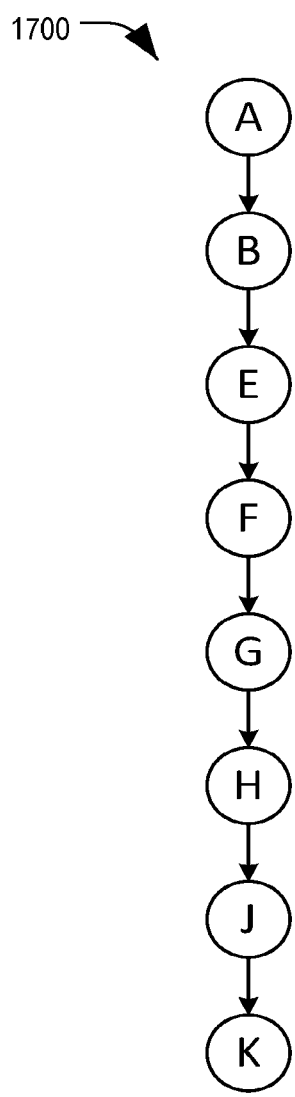
FIG. 17 depicts a diagram illustrating a final phase of the pipeline of stages for the particular process.

Referring to FIG. 15, a diagram illustrating a twelfth phase 1500 of the pipeline of stages for the particular process is shown. According to FIG. 15, Stage I has been truncated (i.e., removed) from the pipeline of stages and the potential downstream stages (i.e., Stage I, Stage J, and Stage K) are illustrated. The pipeline modifier 162 is configured to perform a traversal and determine whether an alternative path, starting from Stage H and using the downstream stages, results in a reduction to the ninth value 1250 of the cost function. If an alternate path results in reduction to the ninth value 1250 of the cost function, the alternate path becomes the new greedy path. FIGS. 16-17 depict an illustrative example of building an alternate path, starting at Stage H, resulting in a reduction to the ninth value 1250 of the cost function.

Referring to FIG. 16, a diagram illustrating a thirteenth phase 1600 of the pipeline of stages for the particular process is shown. According to FIG. 16, the pipeline modifier 162 adds a transition from Stage H to Stage J to begin construction of the new greedy path associated with the upper bound 180 that is less than the ninth value 1250 of the cost function. Referring to FIG. 17, a diagram illustrating the final phase 1700 of the pipeline of stages for the particular process is shown. According to FIG. 17, the pipeline modifier 162 adds a transition from Stage J to Stage K to complete construction of the new greedy path associated with the upper bound 180.

It should be understood after completion of the final phase 1700 of the pipeline of stages, the pipeline modifier 162 and the cost function improvement verifier 164 can determine whether a potential reduction to the value of the cost function (associated with the final phase 1700 of the pipeline of stages) is possible. If possible, the final phase 1700 of the pipeline of stages is traversed using similar techniques to find an alternate greedy path. If it is determined that a potential reduction to the value of the cost function is not possible, the processor 104 outputs the final phase 1700 of the pipeline of stages to the output device 126, as shown in FIG. 1.

The techniques described with respect to FIGS. 1-17 enable the computing device 102 to construct the pipeline of stages that is indicative of a most frequently travelled path to perform the particular process. By using the cost function to determine the greedy path, during the construction process, the computing device 102 can ensure that additional stages added to the pipeline of stages is representative of the most frequently travelled path to perform the particular process. Additionally, using the upper bound 180, based on the best possible configuration of stages, to determine whether a potential reduction to value of the cost function exists, enables the computing device 102 to determine whether traversal could potentially be successful prior to traversing alternate paths. As a result, computing resources, such as power, can be saved in circumstances where traversal would not lead to reduction to the value of the cost function.

Referring to FIG. 18, a flowchart illustrating a method 1800 of generating a pipeline of stages for a particular process is shown. The method 1800 can be performed by the components of the system 100. For example, the method 1800 can be performed by the processor 104.

The method 1800 includes gathering a plurality of data sets for a particular process, at 1802. Each data set indicates transitions between different stages for a corresponding occurrence of the particular process. For example, referring to FIGS. 1 and 2, the processor 104 gathers the plurality of data sets 200 for the particular process. Each data set 202-210 indicates transitions between different stages for a corresponding occurrence of the particular process.

The method 1800 also includes generating stage transition data based on the plurality of data sets, at 1804. The stage transition data indicates an aggregate value (e.g., total count) for each distinct transition. For example, referring to FIGS. 1 and 3, the stage transition data generator 150 generates the stage transition data 300 based on the plurality of data sets 200. The stage transition data 300 indicates the aggregate value, such as a total count, for each distinct transition between stages in the plurality of data sets 200. For example, the stage transition data generator 150 converts the plurality of data sets 200 into a plurality of counts (e.g., the stage transition data 300) for transitions between stages.

The method 1800 also includes determining a root stage based on the plurality of data sets, at 1806. The root stage indicates a first stage in a pipeline of stages for the particular process. For example, referring to FIGS. 1 and 4, the root determination unit 152 determines the root stage based on the plurality of data sets 200. The root stage indicates the first stage in a pipeline of stages for the particular process. According to one implementation, the root determination unit 152 can identify particular stages that are not potential downstream stages from other stages. For example, the root determination unit 152 can identify Stage A and Stage C as stages that are not potential downstream stages from any other stage in the plurality of data sets 200 or the stage transition data 300. After identifying the stages that are not potential downstream stages from other stages, the root determination unit 152 can select, from the identified stages, the stage that is associated with the most transitions as the root stage. For example, there are sixty-five (65) transitions from Stage A to Stage B and thirty (30) transitions from Stage A to Stage F. Thus, Stage A is associated with ninety-five (95) transitions. On the contrast, there are only five (5) transitions from Stage C to Stage D. Thus, Stage C is associated with five (5) transitions. As a result, the root determination unit 152 can determine that Stage A is the root stage. According to one implementation, the root determination unit 152 can identify particular stages that are infrequently potential downstream stages from other stages.

The method 1800 also includes selecting each additional stage in the pipeline of stages, at 1808. Each additional stage is sequentially selected based on a dynamically determined path constructed to reduce a value of a cost function. For example, referring to FIGS. 1 and 5-12, the pipeline builder 158 and the cost function determination unit 160 select additional stages in the pipeline of stages.

According to one implementation of the method 1800, the value of the cost function is dynamically determined each time an additional stage is added to the pipeline of stages and is independent of a previous value of the cost function associated with addition of a previous stage to the pipeline of stages. According to one implementation of the method 1800, the value of the cost function is reduced in response to detection of a transition between stages in the pipeline of stages according to a first direction. According to one implementation of the method 1800, the value of the cost function is increased in response to detection of a transition between stages in the pipeline of stages according to a second direction. According to one implementation of the method 1800, the value of the cost function is increased in response to detection of a transition between a stage in the pipeline of stages and a stage outside of the pipeline of stages.

The method 1800 also includes selectively modifying the pipeline of stages, starting at a last stage in the pipeline of stages and ending at the root stage, responsive to detecting an improvement to the value of the cost function, at 1810. For example, the cost function improvement verifier 164 determines whether the upper bound 180 is lower than the ninth value 1250 of the cost function. If the upper bound 180 is lower than the ninth value 1250, the cost function improvement verifier 164 determines that there is a potential reduction to the value of the cost function exists and path traversal is initiated at the pipeline modifier 162.

The method 1800 also includes generating a command to perform the particular process using the modified pipeline of stages, at 1812. For example, the processor 104 can generate a command to perform the particular process using the modified pipeline of stages (e.g., the final phase 1700 of the pipeline of stages). To illustrate, the processor 104 can output the final phase 1700 of the pipeline of stages to the output device 126 as a command to perform the particular process using the modified pipeline of stages. According to one implementation, the method 1800 includes generating a new data set based on the modified pipeline of stages and adding the new data set to the plurality of data sets.

According to one implementation, the method 1800 includes determining an upper bound of the cost function that is associated with a best possible configuration of stages for the particular process. For example, the cost function improvement verifier 164 determines the best possible improvement over the ninth value 1250 of the cost function associated with the greedy path. The method 1800 can also include comparing the upper bound to the value of the cost function. For example, the cost function improvement verifier 164 compares the upper bound 180 to ninth value 1250 of the cost function. The method 1800 can also include determining that a potential reduction to the value of the cost function exists in response to a determination that the upper bound is less than the value of the cost function. For example, the cost function improvement verifier 164 determines that a potential reduction to the ninth value 1250 of the cost function exists in response to determining that the upper bound 180 is less than the ninth value 1250 of the cost function.

According to one implementation of the method 1800, the upper bound is based on a maximum possible gain associated with a truncated path, a minimum possible loss associated with the truncated path, and an outside stage gain. For example, the cost function improvement verifier 164 determines the upper bound ($J_{potential}$) 180 based on the maximum possible gain 182, the minimum possible loss 184, and the outside stage gain 186. According to one implementation, the cost function improvement verifier 164 determines the upper bound ($J_{potential}$) 180 using the following equation: $J_{potential}=J_{truncated}-Gain_{max}+Loss_{min}-OutsideStageGain$.

According to one implementation of the method 1800, selectively modifying the pipeline of stages includes truncating the last stage from the pipeline of stages and traversing an alternate path from a first particular stage in an attempt to reduce the value of the cost function. The first particular stage is adjacent to the last stage in the pipeline of stages. For example, referring to FIGS. 1 and 13, the pipeline modifier 162 truncates the last stage (i.e., Stage K)

from the pipeline of stages and traverses an alternate path from the first particular stage (i.e., Stage J) in an attempt to reduce the ninth value 1250 of the cost function.

According to one implementation of the method 1800, selectively modifying the pipeline of stages includes truncating the first particular stage in response to a determination that the alternate path fails to reduce the value of the cost function and traversing a second alternate path from a second particular stage in an attempt to reduce the value of the cost function. The second particular stage is adjacent to the first particular stage in the pipeline of stages. For example, referring to FIGS. 1 and 14, the pipeline modifier 162 truncates the first particular stage (i.e., Stage J) in response to a determination that the alternate path fails to reduce the ninth value 1250 of the cost function and traverses a second alternate path from a second particular stage (i.e., Stage I) in an attempt to reduce the ninth value 1250 of the cost function.

According to one implementation of the method 1800, selectively modifying the pipeline of stages includes truncating the second particular stage in response to a determination that the second alternate path fails to reduce the value of the cost function and traversing a third alternate path from a third particular stage in an attempt to reduce the value of the cost function. The third particular stage is adjacent to the second particular stage in the pipeline of stages. For example, referring to FIG. 1 or 15-17, the pipeline modifier 162 truncates the second particular stage (i.e., Stage I) in response to a determination that the second alternate path fails to reduce the ninth value 1250 of the cost function and traverses a third alternate path from a second particular stage (i.e., Stage H) in an attempt to reduce the ninth value 1250 of the cost function. The third alternate path, illustrated by the final phase 1700 of the pipeline of stages in FIG. 17, becomes the new greedy path.

The method 1800 enables the computing device 102 to construct the pipeline of stages that is indicative of a most frequently travelled path to perform the particular process. By using the cost function to determine the greedy path, during the construction process, the computing device 102 can ensure that additional stages added to the pipeline of stages is representative of the most frequently travelled path to perform the particular process. Additionally, using the upper bound 180, based on the best possible configuration of stages, to determine whether a potential reduction to value of the cost function exists, enables the computing device 102 to determine whether traversal could potentially be successful prior to traversing alternate paths. As a result, computing resources, such as power, can be saved in circumstances where traversal would not lead to reduction to the value of the cost function.

Particular aspects of the present disclosure have thus been described herein with reference to the drawings. Particular features illustrated or discussed with respect to one drawing may be usable in combination with other implementations (e.g., as described with reference to other drawings) according to the disclosure. Further, illustrated method steps may be optional, may be combined with method steps presented in a different drawing, or may be performed in a different order than is presented in a drawing. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, or an aspect, and should not be construed as limiting or as indicating a preference or a preferred implementation. As used herein, an ordinal term (e.g., "first," "second," "third," etc.) used to modify an element, such as a structure, a component, an operation, and the like, does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. As used herein, the terms "computer-readable storage device" and "memory device" refer to articles of manufacture and not to signals.

Particular aspects of the present disclosure have been described with reference to the processes of minimization. Minimization is a way to express optimization. Thus, in some implementations, the minimization may be an optimization or improvement performed by a disclosed apparatus (e.g., a processor-based device, a computer, a computer system). Such optimization could be a minimization or a maximization, e.g., reduce or increase. A person of ordinary skill in the art will appreciate that a minimization may be converted to a maximization with change of parameters or simple inversion of a function. Thus an "upper bound" like bound 180 become a "lower bound".

A disclosed computer-implemented method of generating a pipeline of stages for a particular process includes gathering a plurality of data sets for the particular process. Each data set indicates transitions between different stages for a corresponding occurrence of the particular process. The computer-implemented method also includes generating stage transition data based on the plurality of data sets. The stage transition data indicates an aggregate value for each distinct transition. The computer-implemented method further includes determining a root stage based on the plurality of data sets. The root stage indicates a first stage in the pipeline of stages for the particular process. The computer-implemented method also includes selecting each additional stage in the pipeline of stages. Each additional stage is sequentially selected based on a dynamically determined path constructed to reduce a value of a cost function. The computer-implemented method further includes selectively modifying the pipeline of stages, starting at a last stage in the pipeline of stages and ending at the root stage, responsive to detecting an improvement to the value of the cost function. The computer-implemented method also includes generating a command to perform the particular process using the modified pipeline of stages.

A disclosed computer-readable storage device stores instructions that, when executed by a computer, cause the computer to perform operations including gathering a plurality of data sets for a particular process. Each data set indicates transitions between different stages for a corresponding occurrence of the particular process. The operations also include generating stage transition data based on the plurality of data sets. The stage transition data indicates an aggregate value for each distinct transition. The operations further include determining a root stage based on the plurality of data sets. The root stage indicates a first stage in a pipeline of stages for the particular process. The operations also include selecting each additional stage in the pipeline of stages. Each additional stage is sequentially selected based on a dynamically determined path constructed to reduce a value of a cost function. The operations further include selectively modifying the pipeline of stages, starting at a last stage in the pipeline of stages and ending at the root stage, responsive to detecting an improvement to the value of the cost function. The operations further include generating a command to perform the particular process using the modified pipeline of stages.

A disclosed apparatus includes a processor and a memory that stores instructions that, when executed by the processor, cause the processor to perform operations including gathering a plurality of data sets for a particular process. Each data set indicates transitions between different stages for a corresponding occurrence of the particular process. The operations also include generating stage transition data based on the plurality of data sets. The stage transition data indicates an aggregate value for each distinct transition. The operations further include determining a root stage based on the plurality of data sets. The root stage indicates a first stage in a pipeline of stages for the particular process. The operations also include selecting each additional stage in the pipeline of stages. Each additional stage is sequentially selected based on a dynamically determined path constructed to reduce a value of a cost function. The operations further include selectively modifying the pipeline of stages, starting at a last stage in the pipeline of stages and ending at the root stage, responsive to detecting an improvement to the value of the cost function. The operations further include generating a command to perform the particular process using the modified pipeline of stages.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. Alternatively, virtual computer system processing can be used to implement one or more of the methods or functionalities as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-18. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method of generating a pipeline of stages for a particular process, the computer-implemented method comprising:
   gathering a plurality of data sets for the particular process, each data set indicating transitions between different stages for a corresponding occurrence of the particular process;
   generating stage transition data based on the plurality of data sets, the stage transition data indicating an aggregate value for each distinct transition;
   determining a root stage based on the plurality of data sets, the root stage indicating a first stage in the pipeline of stages for the particular process;
   selecting each additional stage in the pipeline of stages, each additional stage sequentially selected based on a dynamically determined path constructed to reduce a value of a cost function;
   selectively modifying the pipeline of stages, starting at a last stage in the pipeline of stages and ending at the root stage, responsive to detecting an improvement to the value of the cost function;
   generating a command to perform the particular process using the modified pipeline of stages;
   generating a new data set based on the modified pipeline of stages; and
   adding the new data set to the plurality of data sets.

2. The computer-implemented method of claim 1, further comprising:
   determining an upper bound of the cost function that is associated with a best possible configuration of stages for the particular process;

comparing the upper bound to the value of the cost function; and detecting the improvement to the value of the cost function based on a determination that the upper bound is less than the value of the cost function.

3. The computer-implemented method of claim 2, wherein the upper bound is based on a maximum possible gain associated with a truncated path, a minimum possible loss associated with the truncated path, and an outside stage gain.

4. The computer-implemented method of claim 1, wherein selectively modifying the pipeline of stages comprises:

truncating the last stage from the pipeline of stages; and traversing an alternate path from a first particular stage in an attempt to reduce the value of the cost function, the first particular stage adjacent to the last stage in the pipeline of stages.

5. The computer-implemented method of claim 4, wherein selectively modifying the pipeline of stages further comprises:

truncating the first particular stage in response to a determination that the alternate path fails to reduce the value of the cost function; and traversing a second alternate path from a second particular stage in an attempt to reduce the value of the cost function, the second particular stage adjacent to the first particular stage in the pipeline of stages.

6. The computer-implemented method of claim 1, wherein the value of the cost function is dynamically determined each time an additional stage is added to the pipeline of stages and is independent of a previous value of the cost function associated with addition of a previous stage to the pipeline of stages.

7. The computer-implemented method of claim 1, wherein the value of the cost function is reduced in response to detection of a transition between stages in the pipeline of stages according to a first direction.

8. The computer-implemented method of claim 1, wherein the value of the cost function is increased in response to detection of a transition between stages in the pipeline of stages according to a second direction.

9. The computer-implemented method of claim 1, wherein the value of the cost function is increased in response to detection of a transition between a stage in the pipeline of stages and a stage outside of the pipeline of stages.

10. The computer-implemented method of claim 1, wherein the particular process is associated with one of a human resources process, a semiconductor process, an assembly line process, a manufacturing process, or a data processing process.

11. A computer-readable storage device storing instructions that, when executed by a computer, cause the computer to perform operations comprising:

gathering a plurality of data sets for a particular process, each data set indicating transitions between different stages for a corresponding occurrence of the particular process;

generating stage transition data based on the plurality of data sets, the stage transition data indicating an aggregate value for each distinct transition;

determining a root stage based on the plurality of data sets, the root stage indicating a first stage in a pipeline of stages for the particular process;

selecting each additional stage in the pipeline of stages, each additional stage sequentially selected based on a dynamically determined path constructed to reduce a value a cost function;

selectively modifying the pipeline of stages, starting at a last stage in the pipeline of stages and ending at the root stage, responsive to detecting an improvement to the value of the cost function;

generating a command to perform the particular process using the modified pipeline of stages;

generating a new data set based on the modified pipeline of stages; and adding the new data set to the plurality of data sets.

12. The computer-readable storage device of claim 11, wherein the operations further comprise:

determining an upper bound of the cost function that is associated with a best possible configuration of stages for the particular process;

comparing the upper bound to the value of the cost function; and detecting the improvement to the value of the cost function based on a determination that the upper bound is less than the value of the cost function.

13. The computer-readable storage device of claim 12, wherein the upper bound is based on a maximum possible gain associated with a truncated path, a minimum possible loss associated with the truncated path, and an outside stage gain.

14. The computer-readable storage device of claim 11, wherein selectively modifying the pipeline of stages comprises:

truncating the last stage from the pipeline of stages; and traversing an alternate path from a first particular stage in an attempt to reduce the value of the cost function, the first particular stage adjacent to the last stage in the pipeline of stages.

15. The computer-readable storage device of claim 14, wherein selectively modifying the pipeline of stages further comprises:

truncating the first particular stage in response to a determination that the alternate path fails to reduce the value of the cost function; and traversing a second alternate path from a second particular stage in an attempt to reduce the value of the cost function, the second particular stage adjacent to the first particular stage in the pipeline of stages.

16. The computer-readable storage device of claim 11, wherein the value of the cost function is dynamically determined each time an additional stage is added to the pipeline of stages and is independent of a previous value of the cost function associated with addition of a previous stage to the pipeline of stages.

17. The computer-readable storage device of claim 11, wherein the value of the cost function is reduced in response to detection of a transition between stages in the pipeline of stages according to a first direction.

18. The computer-readable storage device of claim 11, wherein the value of the cost function is increased in response to detection of a transition between stages in the pipeline of stages according to a second direction.

19. An apparatus comprising:

a processor; and a memory storing instructions that, when executed by the processor, cause the processor to perform operations comprising:

gathering a plurality of data sets for a particular process, each data set indicating transitions between different stages for a corresponding occurrence of the particular process;

generating stage transition data based on the plurality of data sets, the stage transition data indicating an aggregate value for each distinct transition;

determining a root stage based on the plurality of data sets, the root stage indicating a first stage in a pipeline of stages for the particular process;

selecting each additional stage in the pipeline of stages, each additional stage sequentially selected based on a dynamically determined path constructed to reduce a value of a cost function;

selectively modifying the pipeline of stages, starting at a last stage in the pipeline of stages and ending at the root stage, responsive to detecting an improvement to the value of the cost function; and generating a command to perform the particular process using the modified pipeline of stages;

generating a new data set based on the modified pipeline of stages; and adding the new data set to the plurality of data sets.

* * * * *